Patented May 15, 1934

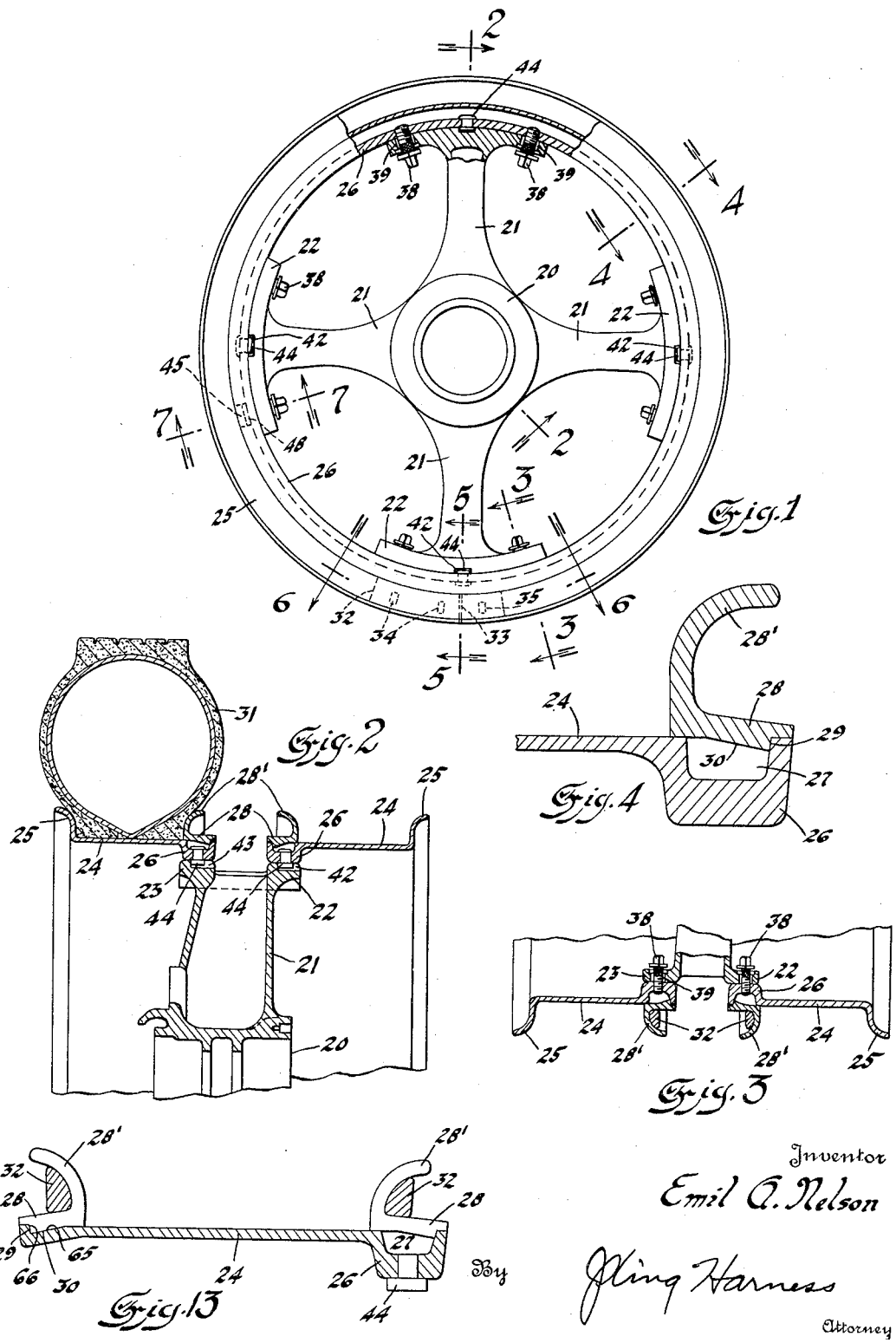

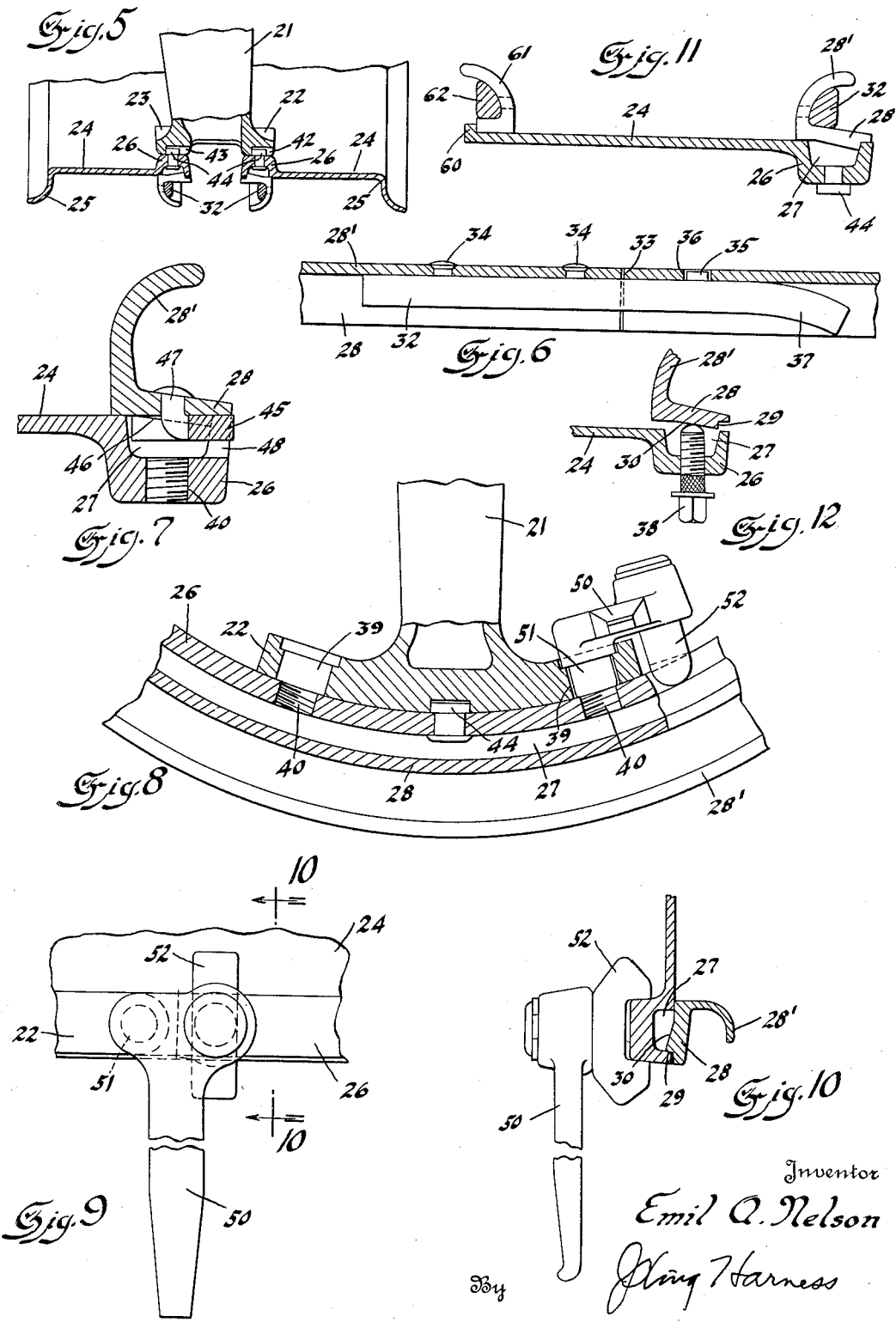

1,958,973

UNITED STATES PATENT OFFICE 1,958,973

WHEEL AND RIM CONSTRUCTION

Emil A. Nelson, Detroit, Mich.

Application July 12, 1928, Serial No. 292,281

5 Claims. (Cl. 301—23)

This invention relates to wheel and rim constructions for motor vehicles and the like, and is an improvement on the construction shown and described in my application for letters patent of the United States for Improvements in Wheels filed March 26th, 1928, and granted January 28, 1929 as Patent No. 1,744,915.

The principal object of the present invention is to provide a new and novel form of wheel and rim construction that will be simple in design, efficient in operation and economical to manufacture.

Another object is to provide a wheel and rim construction in which the rim may be chorded to facilitate its application to the wheel.

Another object is to provide a rim having a removable marginal ring of novel formation and designed to better resist the stresses to which it is subjected than the conventional form of removable flange rings now on the market.

Another object is to provide a rim with a circumferential groove and a split flange ring for cooperation therewith, the flange ring being formed to provide an abutment receivable within the groove and a bearing face on both sides of the groove.

Another object is to provide a ring construction having a removable split flange ring so designed that the pressure of an inflated tire carried thereby tends to maintain the ring in the groove.

Another object is to provide a novel means for preventing possible spreading of a rim flange ring.

Another object is to provide a novel mehod of locating rims on a wheel.

Another object is to provide a novel form of rim seat for a wheel construction.

Another object is to provide means for locating and preventing rotation of a split flange ring on a wheel rim.

A further object is to provide a wrench designated to permit easy application and removal of of a rim to or from a wheel.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views,—

Fig. 1 is a side elevation of a wheel and rim constructed in accordance with the present invention, a portion thereof being broken away to better illustrate the construction of the same.

Fig. 2 is a fragmentary sectional view taken on the line 2—2 of Fig. 1.

Fig. 3 is a fragmentary sectional view taken on the line 3—3 of Fig. 1.

Fig. 4 is an enlarged fragmentary sectional view of the rim taken as on the line 4—4 of Fig. 1 showing the relation of the flange ring in respect thereto.

Fig. 5 is a fragmentary sectional view taken on the line 5—5 of Fig. 1.

Fig. 6 is a fragmentary sectional view through the flange ring taken as on the line 6—6 of Fig. 1.

Fig. 7 is an enlarged fragmentary sectional view taken on the line 7—7 of Fig. 1, and showing the means for locking the flange ring against rotation relative to the rim.

Fig. 8 is an enlarged fragmentary partially broken view illustrating the application of a special wrench to the wheel and rim for the purpose of applying the rim to the wheel or removing it therefrom.

Fig. 9 is a fragmentary plan view of the mechanism shown in Fig. 8.

Fig. 10 is a sectional view taken on the line 10—10 of Fig. 9.

Fig. 11 is an enlarged sectional view taken through a rim in which both side flanges are removable and split, the section being taken on the line of split of the flanges.

Fig. 12 is a fragmentary sectional view showing the manner in which the rim securing bolts may be employed to aid in the removal of the split flange ring from the base.

Fig. 13 is a modified form of rim in which both flanges are removable.

The provision of a wheel for removably receiving dual rims presents many difficulties and heretofore the constructions provided have been more or less complicated and could only be produced at a relatively great cost. Furthermore, few constructions, if any, have been provided where a single wheel could interchangeably receive various widths of rims. With the above limitations of conventional constructions in mind and with a view to a simple and economical construction, I have devised the present invention in which these limitations have been overcome.

In such constructions, particularly when the wheel is of cast steel such as is conventionally employed, particularly for use in connection with heavier vehicles, the cost per pound for the wheel itself usually runs from three to four times the cost of the rim which is to be mounted thereon.

By the present invention, I remove a relatively large portion of the material which is conventionally formed as an integral part of the wheel and instead, form it as an integral part of the rim, with the result that the decreased cost in producing the wheel is much greater than the increased cost in producing the rim and this results in the material saving in the production of the combined rim and wheel. Furthermore, I so position the material that has been transferred to the rim that such material provides a means for securing the rim to the wheel, strengthens the usual weak spot in the rim necessary for reception of the tire valve, and permits the employment of rims of various widths without providing any additional means on the wheel for receiving the same. Another feature of the present invention is that the wheel is provided with no felloe and the ends of the spokes are formed to provide short rim receiving seats which are adapted to closely receive the inner surface of each rim, and I employ four or less spokes whereby not only is the weight of the resulting structure diminished but the rim may be chorded from spoke to spoke in applying it to the wheel, thereby facilitating such application. This construction, moreover, permits a novel and expeditious procedure in putting on and in removing an axially inner or "inboard" rim, as hereinafter described.

In my application for Letters Patent of the United States filed March 26th, 1928, and referred to above, the rim construction therein provided included an enlarged ring-like lateral extension on the body of the rim which not only serves to stiffen the rim but also serves as a bearing face for the rim on the wheel. Furthermore, in that construction I employed a flange ring of conventional construction. I have found that the construction of the rim shown in the above mentioned application is more expensive to manufacture than I desire, and also that the conventional type of flange ring therein illustrated is liable to deform when being removed especially when employed in connection with large tires and high pressure such as are commonly met with in bus or truck practice. Accordingly, the rim provided in the present invention provides a construction which is more economical to manufacture than that shown in my previous application without losing any of the inherent advantages thereof, and furthermore, I provide a flange ring in connection with the same of such a design as to effectively resist any tendency of the tire pressure towards deforming the same or deformation during removal.

In accordance with the present invention I show in the accompanying drawings a wheel comprising a hub portion 20 provided with four integral radially extending spokes 21, each of which terminates at its outer end in an outer flange-like seat portion 22 and an inner flange-like seat portion 23, each of which is provided with a cylindrical outer surface of equal diameters. Each seat 22 and 23 is disconnected circumferentially of the wheel from its adjacent seat 22 or 23. Furthermore, each seat 22 is separated from the corresponding seat 23 on the same spoke, the portion of the spoke 21 connecting the two being slightly cut away radially of the wheel. The hub and spokes are preferably of hollow cast construction, all integrally joined together and formed to provide maximum strength with minimum weight, and also to leave, between seats 22 and 23, openings or depressions exceeding said seats in breadth and permitting a seat-engaging portion of an inner rim to be "hooked over" one or more of the seats 22, as a step in the application of the inner or inboard rim.

The rims comprise a base 24 and a marginal flange ring 25 which may be formed integrally with the base, as shown, or may be an endless ring formed separately therefrom and held against lateral displacement by a marginal flange on the base as in other conventional constructions. Instead of forming the opposite side of the rim as in conventional constructions, and instead of forming it with the enlarged laterally projecting ring-like portion as in my previous application above referred to, in the present invention I form it with a radially inwardly extending enlarged marginal portion 26, best shown in Fig. 4. The portion 26, shown as having an axial diameter less than that of the opening between a seat 22 and a seat 23, as measured parallel with the wheel axis, has formed therein an outwardly opening continuous groove 27. The portion 26 in this construction serves the same purpose as the laterally extending enlarged ring in my previous application in that it includes a certain amount of the metal which in conventional constructions would be included in the wheel felloe, but the particular trough-providing form of enlarged portion in the present invention, including axially spaced and substantially parallel and flat flanges, shown as radially terminating in coaxial cylindrical surfaces, for slidable engagement by the mentioned ring, is more readily formed by a rolling process than that shown in my previous application.

The removable flange ring which I provide for this rim construction is of novel construction. As best illustrated in section in Fig. 4 this ring, which is of the split type, comprises a base portion 28 and an upwardly and outwardly curved or radially flaring flange portion 28'. The base portion 28 is of sufficient width so as to bridge the groove 27, and its radially inner face has formed thereon a continuous shoulder 29 preferably substantially flat and perpendicular to the rim axis which is adapted to bear against a parallel and cooperating outer side wall of the groove 27. The shoulder 29 is of relatively small radial depth and the radially inner face of the base 28 from the radially inner edge of the shoulder and within the confines of the groove 27, may be beveled or conically flared axially inward, as at 30 to the normal plane of the cylindrical part of the base, adjacent the axially inner edge thereof. The flange ring is so proportioned that when the tire such as 31 in Fig. 2 is positioned on the ring and inflated, the line of force of the expansive pressure of the inflated tire passes through the base 28 of the flange ring at a point axially inward of that edge of the rim which contacts with the axially outer edge of the portion 26. The result is that the expensive pressure of the tire tends to compress the ring 28 and hold its axially spaced but concentric concave cylindrical surfaces in contact with the radially outer cylindrical surfaces, of the rim on both the axially outer and inner sides of the slot 27, at the respective edges of the substantially parallel flanges of that channel-section enlargement 26 in which said slot or groove is shown as provided.

In the conventional types of rim construction provided with a removable flange ring having a portion received within a groove in the rim, the construction is such that in order to insure against possible forcing off of the flange ring by the pressure of the tire the inwardly projecting part must be of relatively great depth. Consequently, when it is desired to remove the flange ring in conventional constructions, and particularly in those constructions employed for heavy duty work such as in connection with buses and trucks, the amount which it is necessary to spring the flange ring in order to remove it from the groove is often so great as to cause permanent distortion of the ring. With the present construction not only is the flange ring urged radially inward against its seat, shown as cylindrical on both sides of the groove 27 by the pressure of the inflated tire, but as a result of this feature I am enabled to form the shoulder 29 of such relatively small depth that it is necessary to spring the flange ring radially only a relatively small amount in order to spring it out of the groove 27 in order to remove it from the rim.

As a further means for insuring against possible accidental displacement of the flange ring I provide a member 32, as indicated in Fig. 6, in connection with the flange ring at the point of split 33 thereof. The member 32 is formed of relatively stiff and heavy material and is slightly arch-shaped so as to be properly received within the groove formed between the base 28 and flange 28'. This rigid arcuate member 32 may be provided with two lugs 34 which are shown as staked into the flange 28' peripherally at one side of the line of split 33. The member 32 projects across the line of split and on the opposite side thereof is provided with a lug 35 which is removably received within an opening 36 in the flange 28'. This locks the flange ring against expansion due to any reason whatsoever as long as the lug 35 remains in the opening 36. In service it is impossible to spring the free end of the flange ring out of contact with the lug 35 when the tire is inflated due to the fact that the expansive pressure of the tire continually and firmly holds the shoulder 29 around the entire circumference of the flange ring in contact with the axially inner surface of the axially outer wall of the groove 27.

The free end of the member 32 is bent outwardly as at 37 so that when it is desired to remove the flange ring, the tire is deflated, which thereby permits the flange ring to be forced axially inwardly, and thereafter a screw driver or other suitable instrument is inserted between the curved end 37 and the adjacent flange 28', and the adjacent flange 28' is then forced axially inwardly until the lug 35 is disengaged from the opening 36, after which either free end of the flange ring may be sprung radially outwardly so that the shoulder 29 moves out of the slot 27, after which the flange ring may be pulled off of the rim in the conventional manner.

In the so-called "B" type of conventional rim construction the base 24, instead of being provided with an integral side flange as 25, is provided with a relatively short radially extending abutment flange such as is indicated at 60 in Fig. 11, and a continuous flange ring is slipped over the base from the opposite side thereof and abuts against the flange 60. When a tire, and especially a large tire such as is employed on busses and trucks, rusts on the rim it is exceedingly difficult to remove it from such a rim. When the split side ring such as 28, or a conventional type of split side ring is removed, a tool may be worked under the tire where it has rusted to the rim but it may not be forced clear across the base under the tire due to the interference of the side flange on the axially opposite side of the rim. In accordance with the present invention I form the conventionally endless flange ring as a split ring 61 as indicated in Fig. 11, and provide this ring 61 with a member 62 across the line of split thereof, which member is formed in accordance with the member 32 described in connection with the flange ring 28, and co-operates with ring 61 in exactly the same manner. This allows both flange rings 28 and 61, when the tire is deflated, to be removed from the rim after which, if the tire is rusted to the base, an instrument may be passed completely between the rim and the tire and on being worked around the rim, easily loosens the tire from the rim so as to enable it to be removed therefrom.

This same idea may be improved on by forming the rim as indicated in Fig. 13. As shown in that figure, instead of providing the flange-like abutment 60 as in Fig. 11, the corresponding side of the rim is formed to provide a groove 65 in which the inclined portion 30 and shoulder 29 of a split flange ring 28, exactly the same as that previously described, is received. The groove 65 provides an abutment or shoulder 66 which engages the shoulder 29 of the flange ring for preventing lateral displacement thereof. The locking member 32 is employed as previously described. The shoulder 66 may be formed inwardly from or on an equal level with the surface of the base 24 so that when the flange rings 28 are removed no obstruction whatsoever is presented to interfere with removal of the tire from either side of the rim, or to the passage between the tire and rim of a tool for loosening one from the other.

The wheel construction shown is adapted for the reception of two rims of the construction shown, each rim being of identical size and construction, and one rim being received on the seats 22 and the other rim being received on the seats 23. The method of securing the rims to the seats 22 and 23 is shown in Figs. 1 and 3, and comprises preferably two screw members 38 for each seat 22 and 23 which extend in a substantially radial direction through openings 39 in each seat 22 and 23 on either side of the corresponding spoke 21 and are threaded into openings 40 in the enlarged portion 26 of the rim. The screw means 38 thus draw the rims radially into contact with their respective seats 22 or 23 as the case may be. The inside diameter of the portion 26 which is secured by the screw means 38 against the outer circumferential face of the seats 22 and 23 is of substantially the same diameter as the effective diameter of such seats, and in the application of the rims to the seats, the rims may be sprung or chorded between the spokes 21 in order to facilitate their application to the wheel in the same manner as the rim described in my previous application above referred to.

Furthermore, as illustrated in Fig. 12, the fastening screws 38 may be employed for aiding in the removal of the flange ring 28 without danger of distorting it. As illustrated in that figure, the threaded portions of the screws 38 are formed to such a length that when the rim is removed from the wheel, the screws 38 may be threaded into the openings 40 as far as they will go, and their ends will, in projecting into the groove 27, bear against the under face 30 of the flange ring and radially lift it sufficiently to bring the radially inner edge of the flange 29 out of the groove 27 so that it may be axially moved laterally out of the groove. This provides a positive and easy means for removing the flange ring from the rim and insures against expending it to such an extent as to permanently distort it.

In order to locate each of the rims relative to its respective seats so that the openings 39 in the seats and the openings 40 in the rims will be in aligned position, I provide a means as follows: Each seat 22 is provided with a radially and axially outwardly opening groove 42, and each seat 23 is provided with a similar groove 43, the grooves 42 and 43 terminating short of the width of their respective seats 22 and 23. Each rim portion 26 is provided with four radially inwardly projecting lug members 44 spaced circumferentially of the rim in accordance with the spacing of the grooves 42 and 43, which are equally spaced. The lug members 44 on each rim are identically positioned with respect to the rim, and the grooves 42 and 43 are formed so that when the respective rim is applied to the seats with the lugs 44 received within the grooves 42 or 43 as the case may be, and abutting against the end of the groove, the openings 39 and 40 are in alignment. In applying the rims to the wheel the following procedure may be followed: The axially inner rim which is the first to be applied is positioned with the portion 26 axially inward and it is turned so that the lugs 44 are positioned peripherally between adjacent seats 22. The rim is then applied to the wheel and moved axially inward thereon until the portion 26 passes over the outer seats 22. The rim is then turned on its axis until the lugs 44 are brought into axial alignment with the grooves 43, after which the rim may be moved further axially inward until the lugs 44 seat against the axially inner end of the grooves 43, after which the screw members 38 may be inserted in place. The axially outer rim is next applied with the portion 26 thereof positioned axially inward. In this case the rim may be peripherally turned so that the lugs 44 directly enter the slots 42 and said lugs may be brought up against the axially inner end of the same after which the screw means 38 therefor may be inserted in place, thus securing the rim to the wheel.

To obviate an inconvenient turning of the inner rim on its axis after a sliding of the same axially over seats 22, the described construction, however permits an inner rim to be applied by a so-called "hook-on" method rendered practicable by the disclosed proportioning of parts. This new method takes advantage of the mentioned spacing of rim seats 22 from rim seats 23 in such manner as to leave depressions or openings axially therebetween,—at the radially outer ends of the respective spokes. It will be obvious that it is easiest to orient a rim relatively to rim seats before said rim is applied. Accordingly, in using the new technique, an upper part of a marginal portion 26 of a rim that has been so turned as to bring its flange 25 to axially inward position and so rotated as to bring it lugs 44 opposite slots 43, may be axially inwardly inclined at the top thereof, and "hooked over" a seat or seats at the top of an upwardly extending spoke or spokes 21,—the "drop" then permitted by the mentioned cutting away at the end of said spoke or spokes being sufficient to enable the flange 25, the base member 24 and the lower part of seat engaging-portion 26, when swung axially inward, to clear the remaining seats 22. Being thus brought into substantially coaxial relationship with hub 20, the axially inner or "inboard" rim may then be directly so advanced, in an axial direction, as to bring the same to the indicated limit wherein threadless openings 39 become coaxial with threaded openings 40. The final manipulation to effect this result may be effected or aided by means such as a suitable hand tool; and said hand tool may be suitable for use also in the positioning of an axially outer or "outboard" rim and in removal of either rim, as hereinafter described.

If it is desired to prevent peripheral "travel" or rotation of the flange ring relative to the rim, means as shown in Fig. 7 may be employed. This means may comprise a block 45 which is positioned on the radially inner face of the seat portion 28 of the flange ring. For this purpose the radially inner bevelled face 30 of the flange ring is preferably cut away or axially notched as at 46 for a width sufficient to receive the member 45 therein. The member 45 is provided with an upwardly extending lug portion 47 which is projected through the base 28 and staked therein. The outer wall of the groove 27 is cut away as at 48 for a width sufficient to receive the block 45. Thus, the block 45 in being secured against movement to the flange ring and being received in the groove 47 in the axially outer wall of the groove 27 effectively prevents rotation of the flange ring on the rim.

In connection with this wheel and rim construction I show a novel tool for aiding the application of the rim to, and removal of the rim from the wheel. This tool is shown in Figs. 8 to 10 inclusive and comprises a handle portion 50 provided with an integral pin 51 at one end thereof, and an off-set yoke 52 pivotally carried at the same end of the handle 50 as the pin 51 and transversely spaced therefrom. When it is desired to remove the rim from the wheel the fastening means 38 are removed and the pin 51 of the tool is inserted into one of the openings 39 as shown in Fig. 8 with the yoke member 52 straddling the portion 26 of the rim as shown in Figs. 9 and 10. The handle is then turned about the pin 51 with the result that the yoke member 52 in moving relative to the opening 39 forces the rim axially of the wheel. In applying the rim to the wheel it will be apparent that a reversal of this operation will serve to force the rim on the wheel.

It will be evident that with this wheel and rim construction, a relatively light and economically produceable construction results and that the rims are readily interchangeable and are located properly to receive their fastening means regardless of whether they are placed on the inner or outer side of the wheel.

Formal changes may be made in the specific embodiment of the invention described without departing from the spirit or substance of the broad invention, the scope of which is commensurate with the appended claims,—claims to divisible features being presented in my additional application Serial No. 459,600, filed June 4, 1930, which terminated as Patent No. 1,887,378, of November 8, 1932, and my application Serial No. 467,308, filed June 25, 1930, which terminated as Patent No. 1,800,955 of April 14, 1931.

What I claim is:

1. In combination, a wheel provided with a cylindrical rim receiving seat, a rim provided with a radially inwardly extending portion having a cylindrical radially inner surface adapted to be received on said seat, said portion being provided with a radially outwardly opening groove therein, a split ring overlying said groove and provided with a shoulder received therein, and radially extending fastening means extending through said seat and threaded into said portion in line with said groove for securing said rim to said wheel, said fastening means being so proportioned, positioned and threaded as to render the same applicable to expand said ring.

2. In a wheel and rim construction, in combination, a wheel having a cylindrically shaped rim receiving seat, a rim provided with a radially inwardly extending portion received on said seat, said portion being provided wth a radially outwardly opening groove therein, a split flange ring received on said rim over said groove and provided with a shoulder normally lying within said groove, and screw members extending through said rim receiving seat threaded into said radially inwardly extending portion of said rim in line with said groove to secure said rim to said wheel, said screw members being threaded for a length whereby, when said rim is removed from said wheel, they may be threaded through said radially inwardly extending portion of said rim into said groove and against said ring whereby to force said shoulder out of said groove.

3. In combination, a rim suitable for use on a wheel which includes spokes, said rim comprising a base portion having a radially inwardly extending marginal enlargement, said enlargement having a channel section by reason of its being provided with a continuous and radially outwardly opening groove but distinct from any tire-receiving groove, the metal of said enlargement including that at the bottom of said groove, being of sufficiently greater thickness than the general thickness of said base, to obviate in view of the position and the sectional configuration of said enlargement, use of a felloe therewith, a split ring bridging said groove, and a shoulder on said split ring bearing against a substantially flat side wall provided by an axially outer flange defining said groove.

4. A rim comprising a base having a radially outwardly opening annular groove at one edge thereof, and at axially inner and outer edges of the groove, having circumferentially extending seats substantially of the same diameter, and a split tire engaging ring having axially spaced circumferentially extending seats on its inner periphery for engaging the seats on the base, the inner periphery of said ring between said seats, tapering from the axially inner to the axially outer seat, to a smaller diameter, so as to provide a circumferentially extending shoulder engaging the axially outer wall of the groove, the tapered portion of the ring being spaced from the base of the groove.

5. A rim comprising a base portion having a completely annular and radially inwardly extending marginal enlargement, said enlargement being in the form of an annular channel having a radially outwardly opening groove therein, and wherein the base and side walls of the channel are of thickened metal compared to the thickness of the metal in the base of the rim, a ring bearing on the radially outer face of the base on either side of the groove and having a relatively shallow and substantially flat shoulder projecting radially inwardly from its inner periphery for engaging the outer side wall of the groove, the portions of said ring bearing on the base at either side of the groove defining substantially cylindrical surfaces for axial sliding movement on the base, said ring also including a flange extending radially outwardly from the axially inner margin thereof to render tire pressure effective to maintain the shoulders in engagement with the side wall of the groove.

EMIL A. NELSON.